US007520152B2

(12) United States Patent (10) Patent No.: US 7,520,152 B2
Sabo et al. (45) Date of Patent: Apr. 21, 2009

(54) LOCK DEVICE AND SYSTEM EMPLOYING A DOOR LOCK DEVICE

(75) Inventors: Russ C. Sabo, Sewickley, PA (US); John J. Crowley, III, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 328 days.

(21) Appl. No.: 11/225,332

(22) Filed: Sep. 13, 2005

(65) Prior Publication Data

US 2007/0056338 A1 Mar. 15, 2007

(51) Int. Cl.
*B60R 25/04* (2006.01)

(52) U.S. Cl. .......................... 70/257; 70/283; 70/278.7; 70/277; 292/144

(58) Field of Classification Search .................. 70/257, 70/277, 278.2, 278.7, 281, 283, 279.1, 182–186, 70/233; 292/144, 163
See application file for complete search history.

(56) References Cited

U.S. PATENT DOCUMENTS

| | | | | | |
|---|---|---|---|---|---|
| 1,011,956 | A | * | 12/1911 | Hild | 292/144 |
| 1,948,217 | A | * | 2/1934 | Goodwin, Sr. | 70/280 |
| 2,765,648 | A | * | 10/1956 | Hatcher | 70/264 |
| 3,733,861 | A | * | 5/1973 | Lester | 70/153 |
| 3,933,382 | A | * | 1/1976 | Counts et al. | 292/144 |
| 4,148,092 | A | * | 4/1979 | Martin | 361/172 |
| 4,237,711 | A | * | 12/1980 | Kambic | 70/150 |
| 4,490,999 | A | | 1/1985 | Castle et al. | |
| 4,568,998 | A | | 2/1986 | Kristy | |
| 4,679,415 | A | * | 7/1987 | Spratt | 70/118 |
| 4,784,415 | A | * | 11/1988 | Malaval | 292/144 |
| 5,439,262 | A | * | 8/1995 | Fuss et al. | 292/341.16 |
| 5,609,051 | A | * | 3/1997 | Donaldson | 70/278.7 |
| 5,636,536 | A | | 6/1997 | Kinnucan | |
| 5,790,034 | A | | 8/1998 | Khoury | |
| 5,806,355 | A | | 9/1998 | Lanigan et al. | |
| 5,825,288 | A | | 10/1998 | Wojdan | |
| 5,933,086 | A | | 8/1999 | Tischendorf et al. | |
| 5,953,942 | A | * | 9/1999 | Doucet et al. | 70/283 |
| 6,005,487 | A | | 12/1999 | Hyatt, Jr. et al. | |
| 6,032,500 | A | | 3/2000 | Collard, Jr. et al. | |
| 6,047,576 | A | | 4/2000 | Lanigan et al. | |
| 6,107,934 | A | | 8/2000 | Andreou et al. | |
| 6,145,351 | A | | 11/2000 | Levenson | |
| 6,225,903 | B1 | | 5/2001 | Soloway et al. | |
| 6,297,725 | B1 | | 10/2001 | Tischendorf et al. | |
| 6,318,137 | B1 | | 11/2001 | Chaum | |
| 6,384,711 | B1 | | 5/2002 | Cregger et al. | |

(Continued)

*Primary Examiner*—Suzanne D Barrett
(74) *Attorney, Agent, or Firm*—Charles E. Kosinski; Martin J. Moran

(57) ABSTRACT

A door lock device includes a lock having a deadbolt with a first end and a second end. The second end is structured to disengage from an object, such as a portion of a door frame, in a first position and to engage the object in a second position. A spring directly engages and biases the first end of the deadbolt toward the second position thereof. A solenoid includes a plunger structured to engage the deadbolt, in order to hold the deadbolt in the first position thereof. A sensor is structured to sense at least one of the first and second positions of the deadbolt. A wireless controller is structured to receive a wireless signal and responsively energize the solenoid, in order to disengage the plunger of the solenoid from the deadbolt and release the deadbolt to the second position thereof.

12 Claims, 10 Drawing Sheets

U.S. PATENT DOCUMENTS

| | | | | |
|---|---|---|---|---|
| 6,539,755 | B1 * | 4/2003 | Bruwer et al. | 70/107 |
| 6,584,817 | B1 * | 7/2003 | Lien | 70/277 |
| 6,584,818 | B2 | 7/2003 | Bates et al. | |
| 6,612,141 | B2 | 9/2003 | Bates et al. | |
| 6,615,629 | B2 * | 9/2003 | Bates et al. | 70/434 |
| 6,705,136 | B2 * | 3/2004 | Porter | 70/210 |
| 6,812,836 | B2 | 11/2004 | Soloway et al. | |
| 2003/0070458 | A1 * | 4/2003 | Huang | 70/283 |

* cited by examiner

LOCK DEVICE AND SYSTEM EMPLOYING A DOOR LOCK DEVICE

BACKGROUND OF THE INVENTION

1. Field of the Invention

This invention relates generally to systems and, more particularly, to systems for structures employing input sensors and/or output devices and wireless communication. The invention also relates to lock devices and, more particularly, to door lock devices including a deadbolt.

2. Background Information

Wireless communication networks are an emerging new technology, which allows users to access information and services electronically, regardless of their geographic position.

Home (e.g., residential; house; apartment) monitoring, security, and automation (control) systems are well known.

A common type of stand-alone sensor for the home is the conventional smoke detector, which typically employs an audible signal for alarming and a blinking light (e.g., a LED) as a normal condition monitor. A family of such stand-alone sensors exists including, for example, audible door alarms.

Relatively low power, radio frequency (RF) lighting control systems employ wall-mounted, battery powered, RF switch "sensors". Such a sensor sends a signal to a remote power control device, such as relay, in order to turn one or more house lights on and off.

Unlike stand-alone devices, a low power, RF sensor device allows its sensor to be connected to a remote controller or monitor. A simple example of this is the automatic garage door opener. In this example, the "sensor" is a button in a car. When the button is pushed, this causes the garage door to open or close.

It is known to provide a sensor system in which a plurality of sensors are connected, either directly with wires or indirectly with RF communications, to a central control and monitoring device. An example of such a sensor system is a security system, which may include a telephone line for dial out/in communication.

U.S. Pat. No. 6,615,629 discloses a remote locking function employing a lock including a spring, a solenoid and a sensor. The spring is of sufficient strength to cause a carrier component to move downward to a locked position and cause extension of a deadbolt of a deadbolt latch assembly. A backplate assembly comprises an electronic module housing batteries to operate the automatic locking solenoid and a signal receiver.

With the carrier component positioned in a lowered, or locked position, movement of the carrier component from a locked position to an unlocked position is accomplished by either rotating inside knob/lever, rotating thumbturn, or by turning a key to rotate a rotating driver bar of deadbolt assembly, typically with a key. Movement of the carrier component and attached rack causes rotation of pinion and driver bar, retracting the deadbolt. At the end of the carrier component travel, the deadbolt is fully retracted. A catch release, biased by catch release spring, forces a tab feature of catch to move underneath a spring carriage in a manner locking the carrier component in an unlocked position. The spring is now in an extended position, storing energy needed to extend the deadbolt.

The remote locking feature utilizes the solenoid operably connected to the catch release. A remote signal device is utilized with the remote locking mechanism, as a standard keychain transmitter of the type used to unlock cars or garages. When the remote locking signal is received by a signal receiver, the solenoid retracts the catch release, allowing the catch component to rotate away from the spring carriage component. The carrier component is then permitted to move downward under the biasing force of the spring. The downward movement of the carrier component causes extension of the deadbolt, thus locking the door.

If the door is locked when the door is in an opened condition, the deadbolt will prevent the door from closing. In order to prevent accidental locking of the door when the door is opened, the deadlatch assembly includes a sensor to detect whether the door is open or closed.

U.S. Pat. No. 6,584,818 discloses a backplate assembly comprising a sensor component, such as a microswitch, that determines whether the attached carrier component is in a locked position or an unlocked position.

U.S. Pat. No. 6,225,903 discloses a security system comprising an entry door; a lock for selectively locking and unlocking the entry door; and a switch having a first state indicative of the lock being in a locked position and a second state indicative of the lock being in an unlocked position. When the switch is in its first state, the security system is armed and, when the switch is in its second state, the security system is disarmed. A sensor is provided to determine if the lock was engaged from inside or outside the protected premises.

There is room for improvement in lock devices and in systems employing the same.

SUMMARY OF THE INVENTION

These needs and others are met by the present invention, which provides a simple and cost effective lock including a deadbolt having a first end and a second end. The deadbolt second end is structured to disengage from an intended object, such as a portion of a door frame, and to engage the object in a second position. A spring directly engages and biases the first end of the deadbolt toward the second position thereof. An electro-mechanical apparatus includes a stop member which is structured to engage the deadbolt, in order to hold the deadbolt in the first position thereof.

In accordance with one aspect of the invention, a lock device for engaging an object comprises: a lock including a deadbolt having a first end and a second end, which is structured to disengage from the object in a first position and to engage the object in a second position; a spring directly engaging and biasing the first end of the deadbolt toward the second position thereof; an electro-mechanical apparatus including a stop member structured to engage the deadbolt, in order to hold the deadbolt in the first position thereof; and a wireless controller structured to receive a wireless signal and responsively energize the electro-mechanical apparatus, in order to disengage the stop member of the electro-mechanical apparatus from the deadbolt and release the deadbolt to the second position thereof.

The lock may be structured to receive a key. Rotation of the key in a first direction in the lock may drive the deadbolt from the second position to the first position thereof, in order to charge the spring. Rotation of the key in an opposite second direction in the lock may drive the deadbolt from the first position to the second position thereof by overcoming a force from the stop member of the electro-mechanical apparatus or may signal the wireless controller to energize the electro-mechanical apparatus.

The lock may include a manual handle. Movement of the manual handle in a first direction may drive the deadbolt from the second position to the first position thereof, in order to charge the spring. Movement of the manual handle in an opposite second direction may drive the deadbolt from the first position to the second position thereof by overcoming a force from the stop member of the electro-mechanical apparatus or may signal the wireless controller to energize the electro-mechanical apparatus.

The spring may store energy when the lock is opened and the deadbolt moves from the second position to the first position thereof. The lock may be structured to be manually unlocked by driving the deadbolt from the second position to the first position thereof, in order to charge the spring. The lock may be further structured to be automatically locked by energizing the electro-mechanical apparatus in response to receipt of the wireless signal, in order to release the deadbolt from the first position to the second position thereof.

The lock device may be structured for mounting in a door having a frame. The object may be a portion of the frame of the door.

As another aspect of the invention, a lock device for engaging an object comprises: a lock including a deadbolt having a first end and a second end, which is structured to disengage from the object in a first position and to engage the object in a second position; a spring directly engaging and biasing the first end of the deadbolt toward the second position thereof; an electro-mechanical apparatus including a stop member structured to engage the deadbolt, in order to hold the deadbolt in the first position thereof; a sensor structured to sense at least one of the first and second positions of the deadbolt; and a wireless controller structured to receive a wireless signal and responsively energize the electro-mechanical apparatus, in order to disengage the stop member of the electro-mechanical apparatus from the deadbolt and release the deadbolt to the second position thereof.

As another aspect of the invention, a system for a structure comprises: an electronic device including a first wireless communication port and a user interface, the first wireless communication port outputting first wireless signals and inputting second wireless signals; at least one sensor, each of the at least one sensor sensing information and including a second wireless communication port, which sends the sensed information as a corresponding one of the second wireless signals to the first wireless communication port of the electronic device; and at least one device, each of the at least one device outputting a control action and including a third wireless communication port, which receives a corresponding one of the first wireless signals from the first wireless communication port of the electronic device, one of the at least one device being a door lock device for engaging an object, the door lock device comprising: a lock including a deadbolt having a first end and a second end, which is structured to disengage from the object in a first position and to engage the object in a second position, a spring directly engaging and biasing the first end of the deadbolt toward the second position thereof, an electro-mechanical apparatus including a stop member structured to engage the deadbolt, in order to hold the deadbolt in the first position thereof, and a wireless controller structured to receive the corresponding one of the first wireless signals and responsively energize the electro-mechanical apparatus, in order to disengage the stop member of the electro-mechanical apparatus from the deadbolt and release the deadbolt to the second position thereof.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
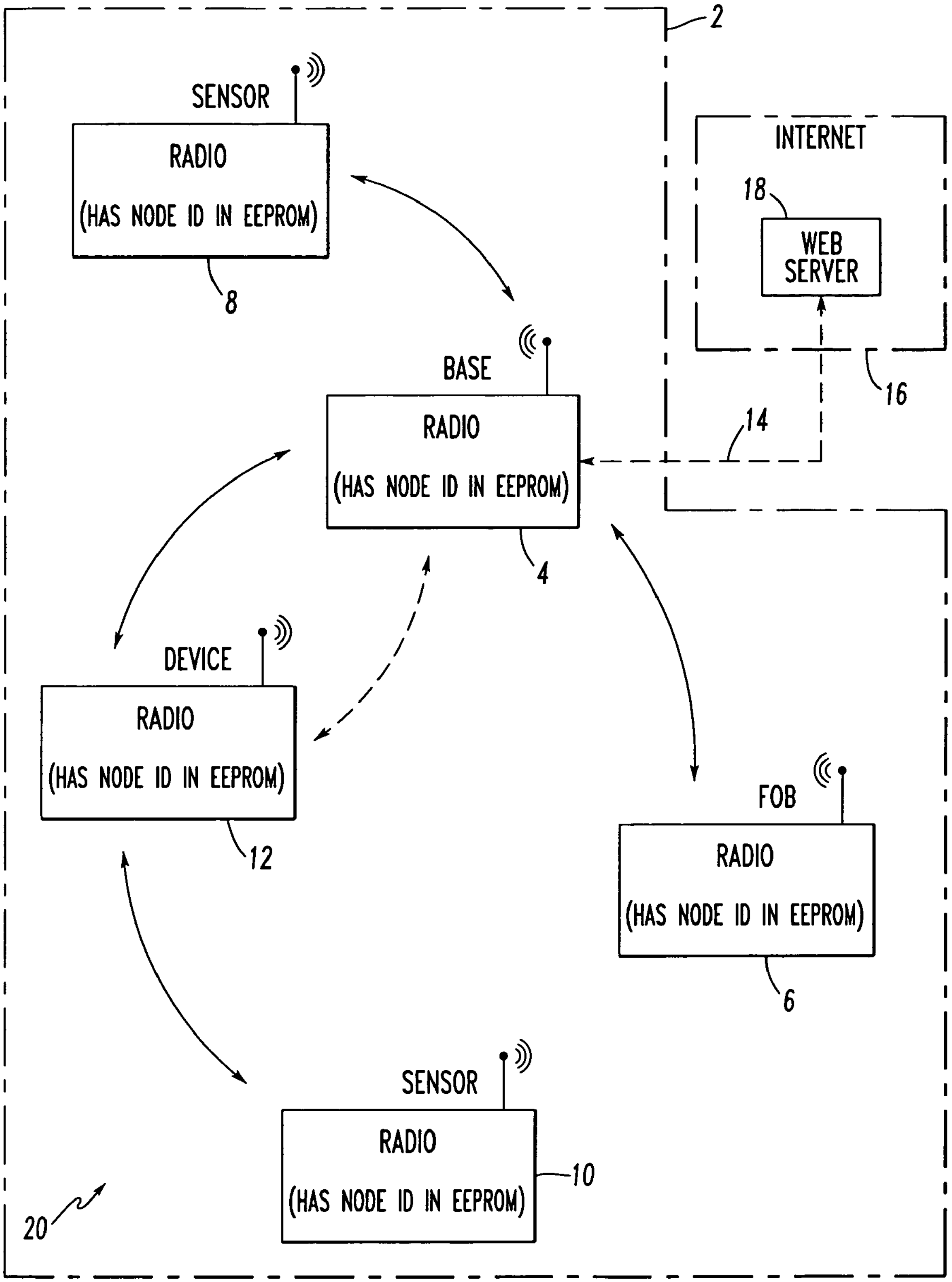
FIG. 1 is a block diagram of a home wellness system in accordance with the present invention.

As employed herein, the term "wireless" shall expressly include, but not be limited by, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication network.

As employed herein, the term "portable wireless communicating device" shall expressly include, but not be limited by, any portable communicating device having a wireless communication port (e.g., a portable wireless device; a portable personal computer (PC); a Personal Digital Assistant (PDA); a data phone).

As employed herein, the term "fob" shall expressly include, but not be limited by, a portable wireless communicating device; a wireless network device; a wireless object that is directly or indirectly carried by a person; a wireless object that is worn by a person; a wireless object that is placed on or coupled to a household object (e.g., a refrigerator; a table); a wireless object that is coupled to or carried by a personal object (e.g., a purse; a wallet; a credit card case); a portable wireless object; and/or a handheld wireless object.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited by, a "headless" base station; and/or a network coordinator.

As employed herein, the term "system" shall expressly include, but not be limited by, a system for a home or other type of residence or other type of structure, or a system for a land vehicle, a marine vehicle, an air vehicle or another motor vehicle.

As employed herein, the term "system for a structure" shall expressly include, but not be limited by, a system for a home or other type of residence or other type of structure.

As employed herein, the term "system for a vehicle" shall expressly include, but not be limited by, a system for a land vehicle, a marine vehicle, an air vehicle or another motor vehicle.

As employed herein, the term "residence" shall expressly include, but not be limited by, a home, apartment, dwelling, office and/or place where a person or persons reside(s) and/or work(s).

As employed herein, the term "structure" shall expressly include, but not be limited by, a home, apartment, dwelling, garage, office building, commercial building, industrial building, a roofed and/or walled structure built for permanent or temporary use, a structure for a land vehicle, a structure for a marine vehicle, a structure for an air vehicle, or a structure for another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, all-terrain vehicles, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the terms "home wellness system" or "wellness system" or "awareness system" shall expressly include, but not be limited by, a system for monitoring and/or configuring and/or controlling aspects of a home or other type of residence or other type of structure.

The present invention is described in association with a wireless home wellness or awareness system, although the invention is applicable to a wide range of wireless systems for monitoring and/or configuring and/or controlling aspects of a structure.

FIG. 1 is a block diagram of a wireless home wellness system 2. The system 2 includes a "headless" RF base station 4, a portable RF fob or "house key" 6, a plurality of RF sensors, such as 8,10, and one or more RF output devices, such as 12 (only one device 12 is shown in FIG. 1). The RF base station 4 may include a suitable link 14 (e.g., telephone; DSL; Ethernet) to the Internet 16 and, thus, to a web server 18. The sensors 8,10 may include, for example, the analog sensor 8 and the on/off digital detector 10. The device 12 may include, for example, a water valve, a door lock and/or a wide range of output devices. The sensors 8,10, device 12, base station 4 and fob 6 all employ relatively short distance, relatively very low power, RF communications. These components 4,6,8,10,12 form a wireless network 20 in which the node ID for each of such components is unique and preferably is stored in a suitable non-volatile memory, such as EEPROM, on each such component.

The base station 4 (e.g., a wireless web server; a network coordinator) may collect data from the sensors 8,10 and "page," or otherwise send an RF alert message to, the fob 6 in the event that a critical status changes at one or more of such sensors.

The fob 6 may be employed as both a portable in-home monitor for the various sensors 8,10 and device 12, also, as a portable configuration tool for the base station 4 and such sensors and such device, and, further, as a remote control for such device.

The example base station 4 is headless and includes no user interface. Alternatively, the invention is applicable to servers, such as base stations, having a local or remote user interface. The sensors 8,10 preferably include no user interface, although some sensors may have a status indicator (e.g., an LED (not shown)). The user interface functions are provided by the fob 6 as will be discussed in greater detail, below. As shown with the device 12, the network 20 preferably employs an adhoc, multihop capability, in which the sensors 8,10, the device 12 and the fob 6 do not have to be within range of the base station 4, in order to communicate. The dotted line between the device 12 and the base station 2 represents a communication between the device 12 and the base station 2 where the device 12 acts as a "range extender," for example, for the sensor 10.

Figure 2A:
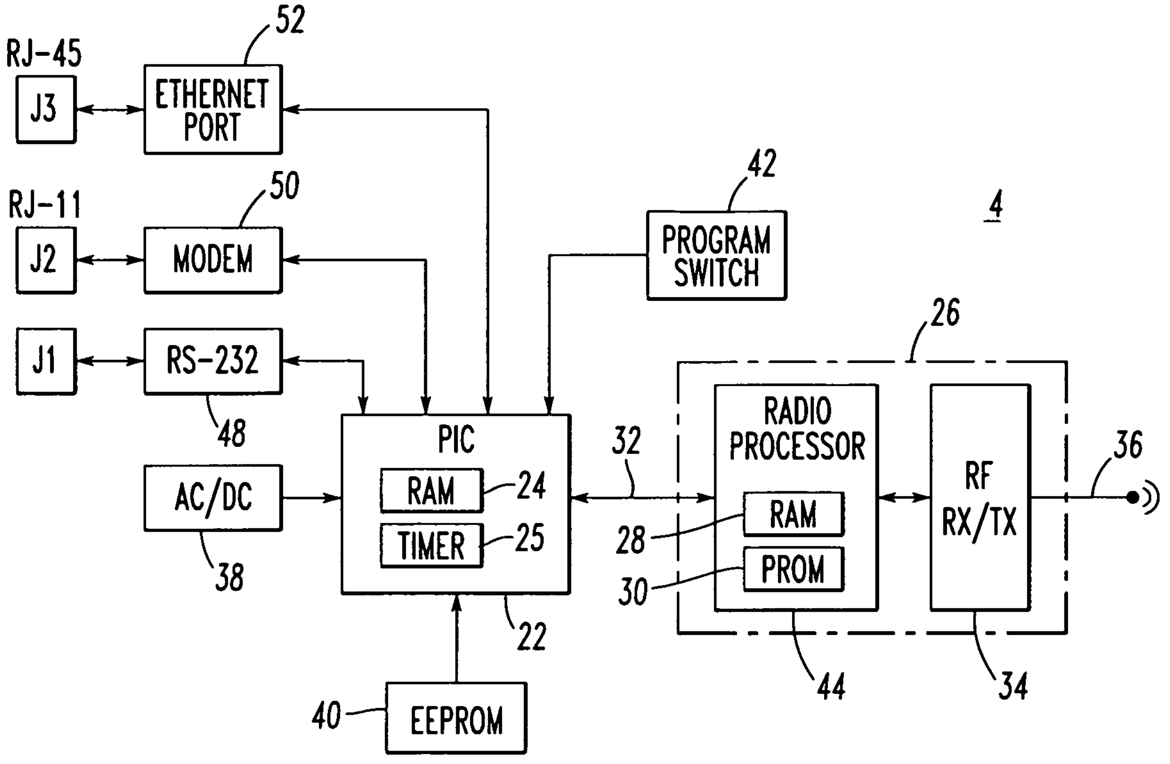
FIG. 2A is a block diagram of the base station of FIG. 1.

FIG. 2A shows the base station 4 of FIG. 1. The base station 4 includes a suitable first processor 22 (e.g., PIC® model 18F2320, marketed by Microchip Technology Inc. of Chandler, Ariz.; Atmel ATmega128L marketed by Atmel Corporation of San Jose, Calif.), having RAM memory 24 and a suitable second radio or RF processor 26 having RAM 28 and PROM 30 memory. The first and second processors 22,26 communicate through a suitable serial interface (e.g., SCI; SPI) 32. The second processor 26, in turn, employs an RF transceiver (RX/TX) 34 having an external antenna 36. As shown with the processor 22, the various base station components receive power from a suitable AC/DC power supply 38. The first processor 22 receives inputs from a timer 25 and a program switch 42 (e.g., which detects mating or engagement with the fob 6 of FIG. 1). The EEPROM memory 40 is employed to store the unique ID of the base station 4 as well as other nonvolatile information such as, for example, the unique IDs of other components, which are part of the wireless network 20, and other configuration related information. The second processor 26 may be, for example, a CC1010 RF Transceiver marketed by Chipcon AS of Oslo, Norway. The processor 26 incorporates a suitable microcontroller core 44, the relatively very low-power RF transceiver 34, and hardware DES encryption/decryption (not shown).

Figure 2B:
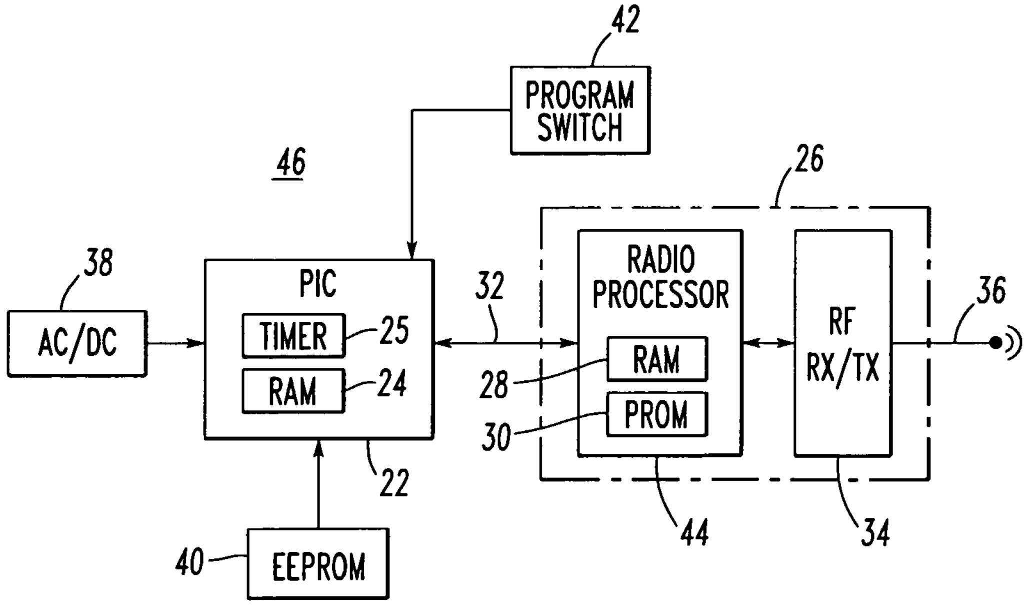
FIG. 2B is a block diagram of a base station in accordance with another embodiment of the invention.

FIG. 2B is a block diagram of another base station 46. The base station 4 of FIG. 2A is similar to the base station 46 of FIG. 2B, except that it also includes one or more interfaces 48,50,52 to a personal computer (PC) (not shown), a telephone line (not shown) and a network, such as an Ethernet local area network (LAN) (not shown). In this example, the PIC processor 22 communicates with a local PC through a suitable RS-232 interface 48 and connector J1, with a telephone line through a suitable modem 50 and connector J2, and with an Ethernet LAN through an Ethernet port 52 and connector J3. Hence, the modem 50 may facilitate communications with a remote cellular telephone, other portable electronic device (e.g., a PDA (not shown)) or a remote service provider (not shown), and the Ethernet port 52 may provide communications with the Internet 16 of FIG. 1 and, thus, with a remote PC or other client device (not shown).

Figure 3:
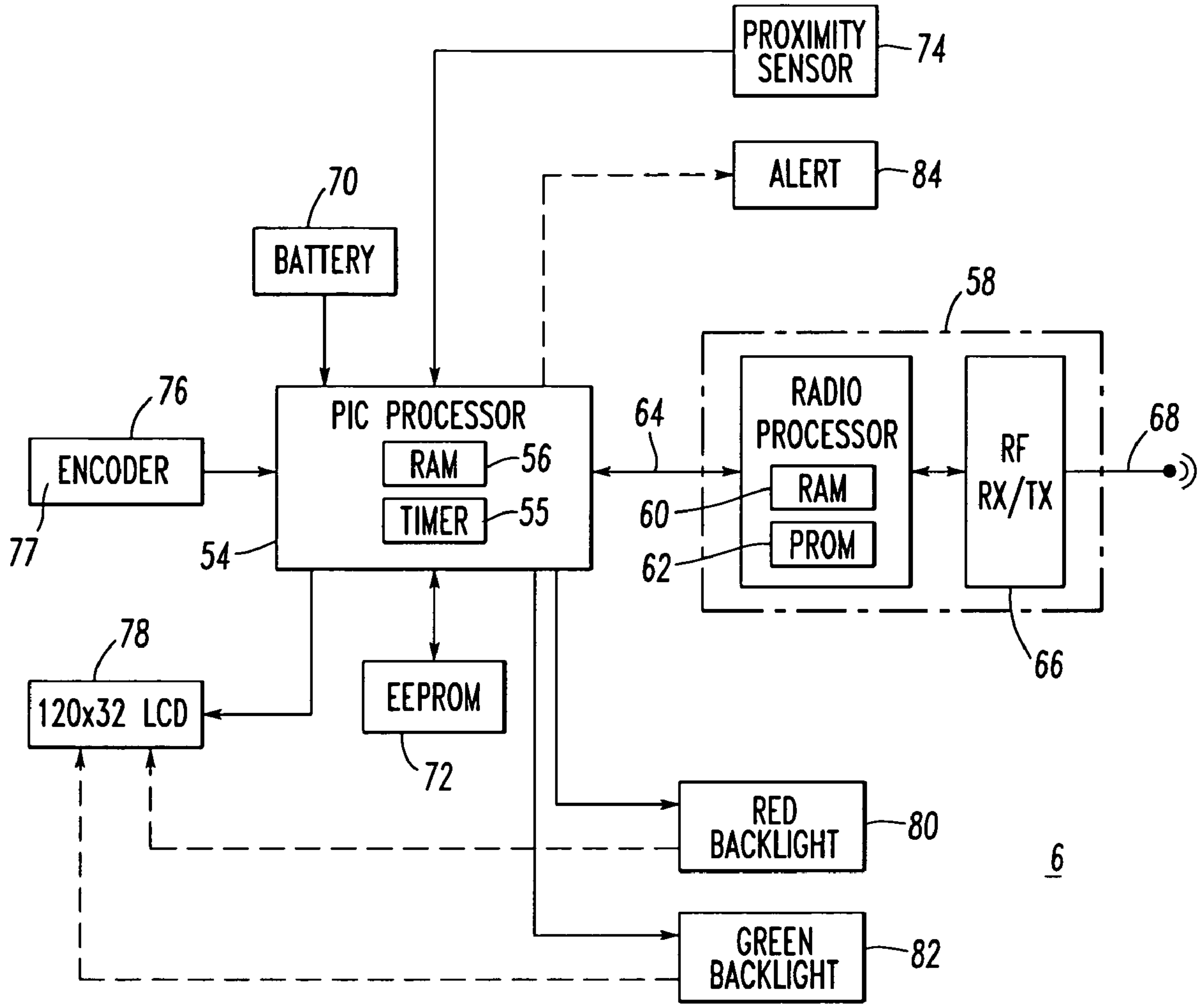
FIG. 3 is a block diagram of the fob of FIG. 1.

FIG. 3 is a block diagram of the fob 6 of FIG. 1. The fob 6 includes a suitable first processor 54 (e.g., PIC) having RAM memory 56 and a suitable second radio or RF processor 58 having RAM 60 and PROM 62 memory. The first and second processors 54,58 communicate through suitable serial interface (e.g., SCI; SPI) 64. The EEPROM memory 72 is employed to store the unique ID of the fob 6 as well as other nonvolatile information. For example, there may be a nonvolatile storage for icons, character/font sets and sensor labels (e.g., the base station 4 sends a message indicating that an on/off sensor or device is ready to configure, and the fob 6 looks up the on/off sensor or device and finds a predefined list of names to choose from). This expedites a relatively rapid interaction. The fob 6 may also employ a short term memory cache (not shown) that is used when the fob 6 is out of range of the base station 4. This stores the list of known sensors and devices and their last two states. This permits the user, even if away, to review, for example, what door was open or what valve was closed, when the fob 6 was last in range.

The second processor 58, in turn, employs an RF transceiver (RX/TX) 66 having an external antenna 68. As shown with the processor 54, the various components of the fob 6 receive power from a battery 70. The first processor 54 receives inputs from a timer 55, a suitable proximity sensor, such as a sensor/base/device program switch 74 (e.g., which detects mating or engagement with one of the sensors 8,10 or with the device 12 or with the base station 4 of FIG. 1), and a user input device, such as, for example, the exemplary encoder 76 or rotary selector/switch, such as a thumbwheel encoder. Typically, such encoder 76 also includes a button 77, through which the user presses, clicks and/or double-clicks to initiate actions through the fob user interface. The first processor 54 also sends outputs to a suitable display 78 (e.g., a 120×32 LCD), one or more visual alerts, such as a red backlight 80 (e.g., an alert is present) and a green backlight 82 (e.g., no alert is present) for the display 78, and an alert device 84 (e.g., a suitable audible, visual or vibrating device providing, for example, a sound, tone, buzzer, vibration or flashing light).

The program switch 74 may be, for example, an ESE-24 MH1T Panasonic® two-pole detector switch or a Panasonic® EVQ-11U04M one-pole micro-switch. This program switch 74 includes an external pivotable or linear actuator (not shown), which may be toggled in one of two directions (e.g., pivoted clockwise and counter-clockwise; in and out), in order to close one of one or two normally open contacts (not shown). Such a two-pole detector is advantageous in applications in which the fob 6 is swiped to engage the sensors 8,10, the device 12 or the base station 4. Hence, by monitoring one of those contacts, when the fob 6 is swiped in one linear direction (e.g., without limitation, right to left, or left to right), the corresponding contact is momentarily closed, without concern for overtravel of the corresponding engagement surface (not shown). Similarly, by monitoring the other of those contacts, when the fob 6 is swiped in the other linear direction (e.g., without limitation, left to right, or right to left), the corresponding contact is momentarily closed and another suitable action (e.g., a diagnostic function; a suitable action in response to removal of the fob 6; a removal of a component from the network 20; an indication to enter a different configuration or run mode) may be undertaken.

Although a physical switch 74 is disclosed, an "optical" switch (not shown) may be employed, which is activated when the fob 6, or portion thereof, "breaks" an optical beam when mating with another system component. Alternatively, any suitable device or sensor (e.g., a reed switch and a magnet) may be employed to detect that the fob 6 has engaged or is suitably proximate to another system component, such as the base station 4 or sensors 8,10 or device 12 of FIG. 1.

The encoder 76 may be, for example, an AEC11 BR series encoder marketed by CUI Inc. of Beaverton, Oreg. Although the encoder 76 is shown, any suitable user input device (e.g., a combined rotary switch and pushbutton; touch pad; joystick button) may be employed. Although the alert device 84 is shown, any suitable annunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 78 preferably provides both streaming alerts to the user as well as optional information messages.

Figure 4:
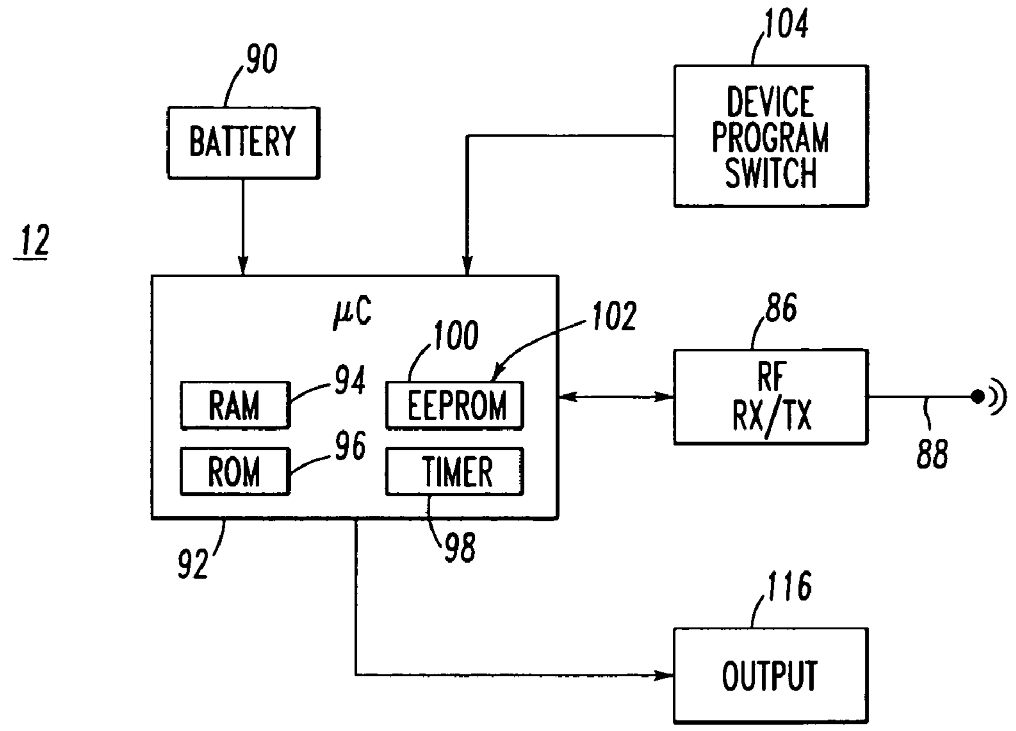
FIG. 4 is a block diagram of the control device of FIG. 1.
Figure 5:
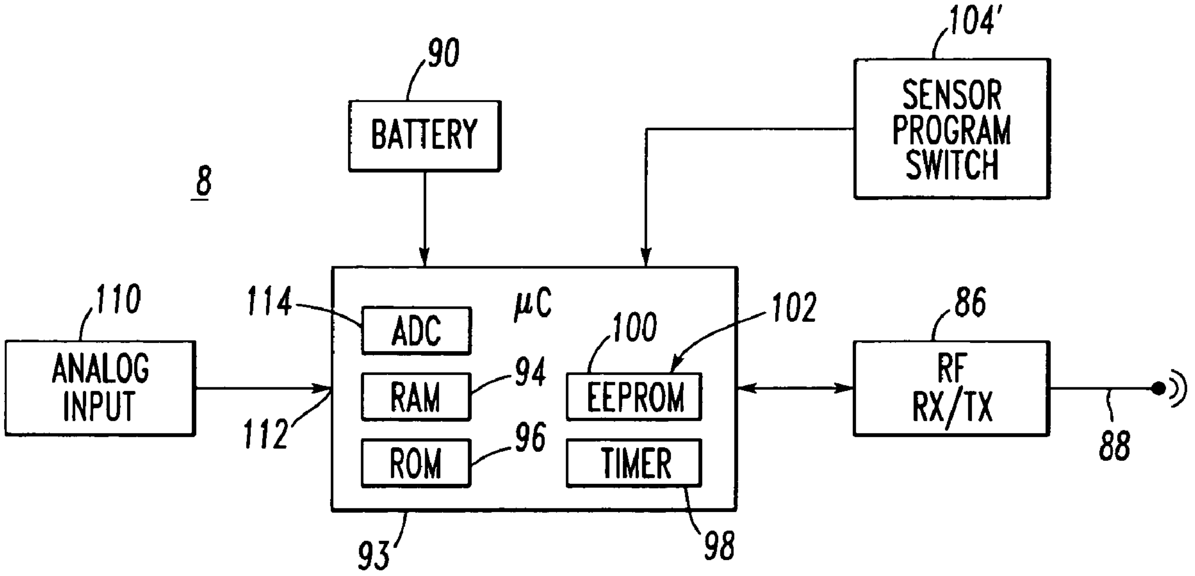
FIG. 5 is a block diagram of one of the input sensors of FIG. 1.

FIGS. 4 and 5 are block diagrams of the device 12 and the analog sensor 8, respectively, of FIG. 1. Each of the device 12 and the sensor 8 includes an RF transceiver (RF RX/TX) 86 having an external antenna 88, a battery 90 for powering the various sensor components, a suitable processor, such as a microcontroller (μC) 92 or 93 having RAM 94, ROM 96, a timer 98 (e.g., in order to provide, for example, a periodic wake-up of the corresponding μC 92 or 93, in order to periodically send device or sensor status information back to the base station 4 of FIG. 1) and other memory (e.g., EEPROM 100 including the unique ID 102 of the component which is stored therein during manufacturing), and a device or sensor program switch 104,104' for mating with the fob program switch 74 of FIG. 3.

Alternatively, the device 12 may be powered from a suitable AC/DC power source (not shown). The device 12 of FIG. 4 includes a suitable control output 116 (e.g., adapted to open and/or close a water valve; close a deadbolt of a door lock). Other non-limiting examples of devices (i.e., output nodes), such as 12, include water valves (shut off; turn on), gas valves (shut off; turn on), electrical switches (power shut off; power turn on), generator (shut off, turn on), garage door (open; close), deadbolt lock (lock; unlock), thermostat (set setpoint), appliance electrical switches (appliance power shut off; appliance power turn on), light switches (shut off lights; turn on lights), communication "firewall" control (enable or secure; disable or insecure), relay device (normally open contact; normally close contact), X10 gateway (enable; disable), camera trigger (trigger snapshot), and water sprinkler (turn on; turn off).

When a sensor (input node) (e.g., water sensor), such as 8,10, joins the wireless network 20 of FIG. 1, the user is prompted by the fob 6 to: (1) select a name for the sensor (e.g., washer; water heater; basement); (2) indicate what event or state change will trigger an alert by the base station 4 (e.g., water present; water absent); and (3) the form of alert (e.g., display message on fob 6; audible tone on fob 6; vibration on fob 6; remote telephone call (e.g., through link 14 of FIG. 1); remote e-mail message (e.g., through link 14 of FIG. 1)).

When a device (output node) (e.g., water valve; door lock), such as 12, joins the wireless network 20, the user is prompted by the fob 6 to: (1) select a name for the device (e.g., main water shut off valve; water heater valve; front door lock); (2) select which of the sensors (or other nodes, such as, for example, fob; pager; cellular telephone; PDA; wireless handheld device), such as 8,10, can control it; and (3) configure any logic (e.g., OR; AND; XOR) to be used for multiple sensor or fob inputs. For example, the first time that any device is added to the system 2 of FIG. 1, the user is automatically taken through fob training menus (not shown), in order to confirm the device name, define the critical control state of the device, select the controller(s), and select the alert method.

The analog sensor 8 of FIG. 5 includes a physical analog input interface 110 (e.g., a water detector) with the μC 93 employing an analog input 112 and a corresponding analog-to-digital converter (ADC) 114.

The device 12 of FIG. 4 and the sensor 8 of FIG. 5 do not include an indicator. It will be appreciated, however, that one or both of such device and sensor may employ an indicator (e.g., to show that a battery 90 is OK; to show that the analog value from the ADC 114 is within an acceptable range of values; to show an on/off input or output state).

Figure 6A:
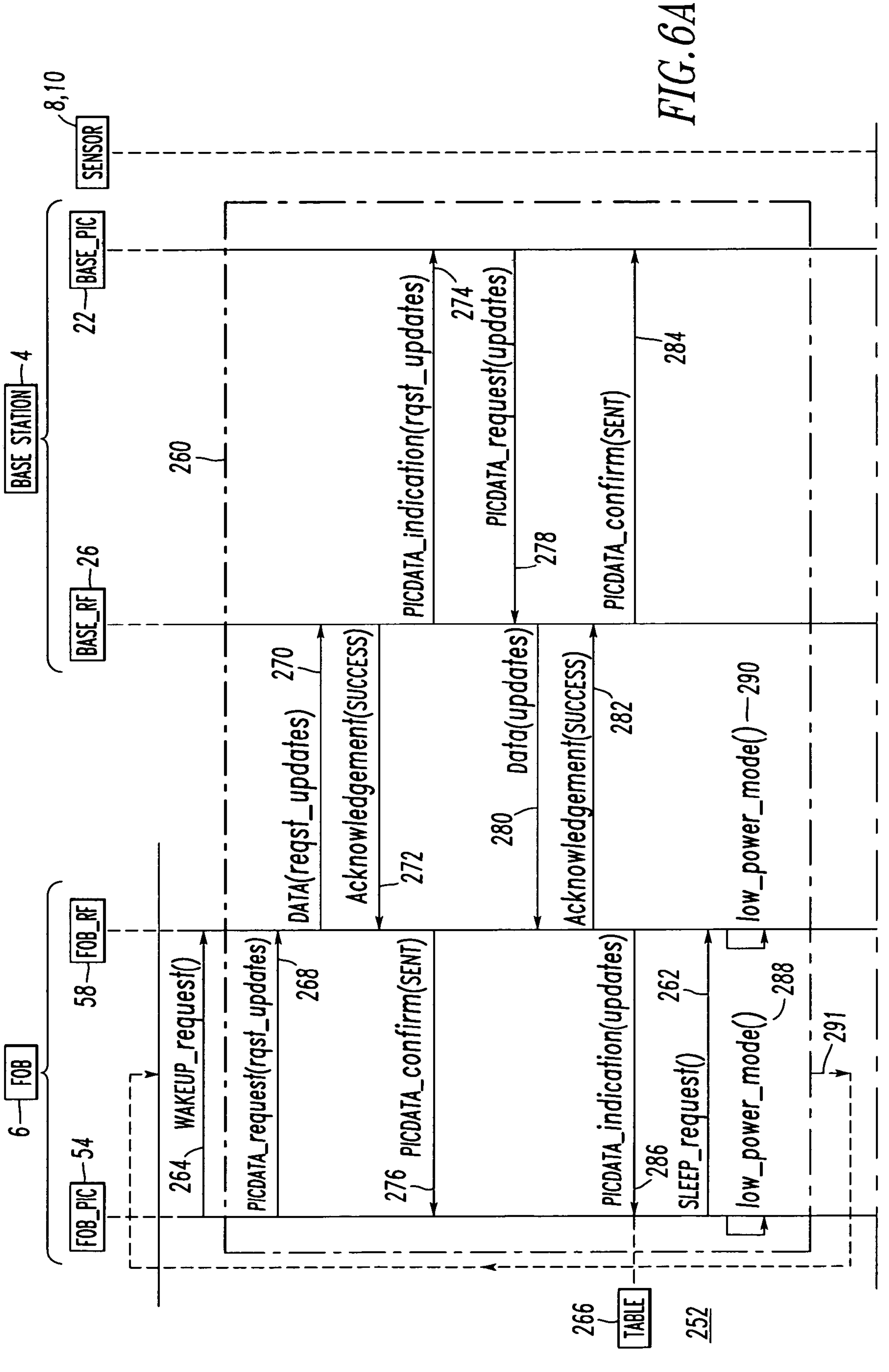
FIGS. 6A-6C are message flow diagrams showing the interaction between the fob and the base station for sending data and alerts to the fob of FIG. 1.
Figure 6B:
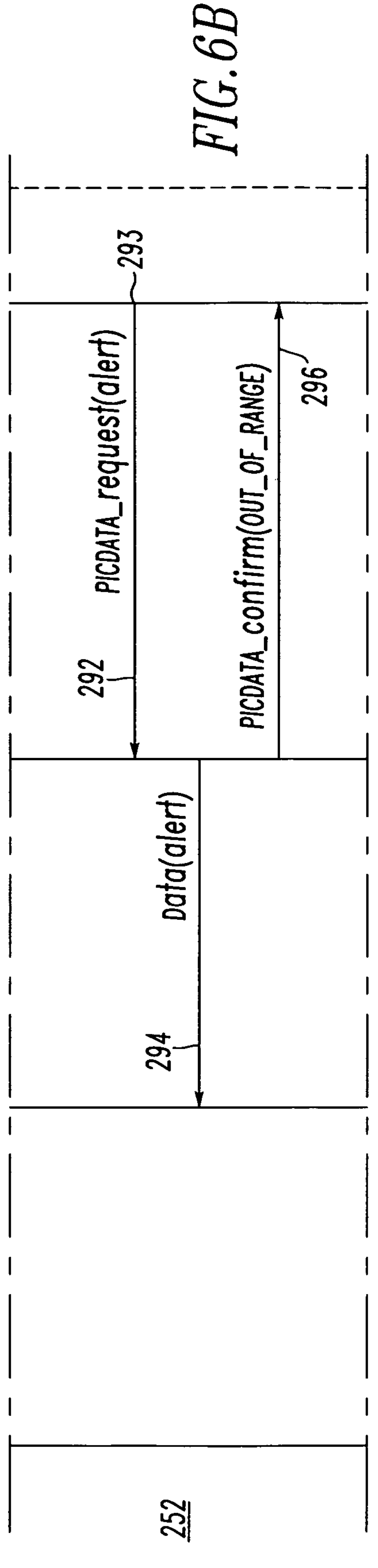

FIGS. 6A and 6B are message flow diagrams 252 and 254, respectively, showing various messages between the base station 4 and the fob 6 for monitoring the sensors 8,10 of FIG. 1 and for sending data and alerts to such fob. FIG. 6A shows that the fob 6 requests and receives information from the base station 4. Preferably, those requests (only one request is shown) are initiated at regular (e.g., periodic) intervals. FIG. 6B shows that the base station 4 may also send a message to the fob 6 in response to a state change of one of the sensors 8,10. In this example, the fob 6 is out of range of the base station 4. As shown in FIGS. 2A-2B, 3 and 6A-6B, the base station 4 includes both a PIC processor 22 and an RF processor 26, and the fob 6 includes both a PIC processor 54 and an RF processor 58. It will be appreciated, however, that such components may alternatively employ one or more suitable processors.

As shown in FIG. 6A, the fob 6 periodically requests and receives information from the base station 4. At the end of the message sequence 260, the fob PIC processor 54 sends a SLEEP_request( ) 262 to the fob RF processor 58. Then, after a suitable sleep interval to conserve battery power (e.g., one minute), the fob PIC processor 54 is woken by the fob timer 55 of FIG. 3, and the fob PIC processor 54 sends a WAKEUP_request( ) message 264 to the fob RF processor 58. In turn, the message sequence 260 is executed to refresh the local fob data table 266 with the most recent available information from base station 4 concerning the sensors 8,10.

As part of the message sequence 260, the fob PIC processor 54 sends a PICDATA_request(rqst_updates) message 268 to the fob RF processor 58, which receives that message 268 and responsively sends a Data(reqst_updates) RF message 270 to the base RF processor 26. Upon receipt of the RF message 270, the base RF processor 26 sends an Acknowledgement (SUCCESS) RF message 272 back to the fob RF processor 58 and sends a PICDATA_indication(rqst_updates) message 274 to the base PIC processor 22. The data requested by this message 274 may include, for example, profile and state information from one or more components, such as the sensors 8,10 and the device 12 (FIG. 1). Here, the fob 6 is requesting an update from the base PIC processor 22 for data from all of the sensors 8,10, including any newly added sensor (not shown), in view of that state change (i.e., there is new data from the newly added sensor). Responsive to receiving the Acknowledgement(SUCCESS) RF message 272, the fob RF processor 58 sends a PICDATA_confirm(SENT) message 276 to the fob PIC processor 54. Responsive to receiving the PICDATA_indication(rqst_updates) message 274, the base PIC processor 22 sends a PICDATA_request(updates) message 278 to the base RF processor 26, which receives that message 278 and responsively sends a Data(updates) RF message 280 to the fob RF processor 58.

After receiving the Data(updates) RF message 280, the fob RF processor 58 sends an Acknowledgement(SUCCESS) RF message 282 back to the base RF processor 26 and sends a PICDATA_indication(updates) message 286, including the requested sensor update data, to the fob PIC processor 54, which updates its local data table 266. Then, if there is no activity of the fob encoder 76 of FIG. 3, or if no alert is received from the base station 4, then the fob PIC processor 54 sends a SLEEP_request( ) message 262 to the fob RF processor 58 and both fob processors 54,58 enter a low_power_mode( ) 288,290, respectively.

After receiving the Acknowledgement(SUCCESS) RF message 282, the base RF processor 26 sends a PICDATA_confirm(SENT) message 284 back to the base PIC processor 22. Following the message sequence 260, the fob timer 55 awakens the fob PIC processor 54, at 291, which sends the message 264 to the fob RF processor 58, in order to periodically repeat the message sequence 260.

FIG. 6B shows an alert message sequence from the base station 4 to the fob 6, in which the fob 6 is out of range of the base station 4. First, at 293, the base station PIC processor 22 sends a PICDATA_request(alert) message 292 to the base station RF processor 26. In response, that processor 26 sends a Data(alert) RF message 294 to the fob RF processor 58. In this example, any RF message sent by the base station 4 while the fob 6 is out of range (or in low power mode) will be lost. After a suitable time out period, the base station RF processor 26 detects the non-response by the fob 6 and responsively sends a PICDATA_confirm(OUT_OF_RANGE) message 296 back to the base station PIC processor 22.

Figure 6C:
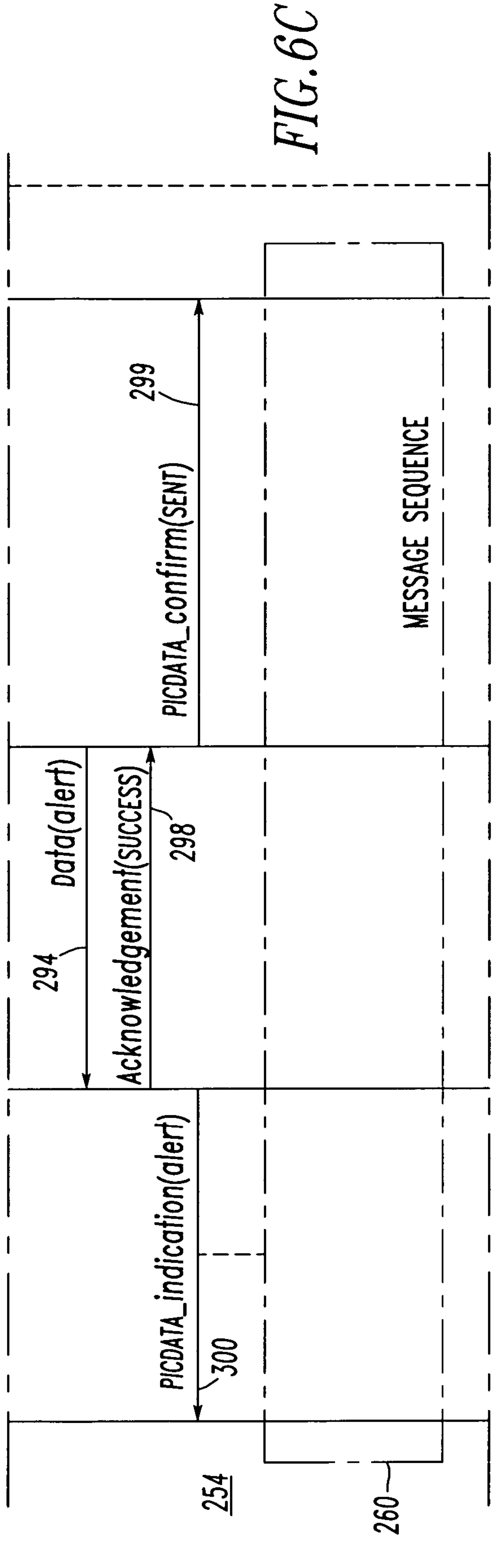

In the example of FIG. 6C, which begins with the Data (alert) RF message 294 (FIG. 6B) to the fob RF processor 58, the fob 6 is in range of the base station 4. The fob RF processor 58 receives the RF message 294 and responsively sends an Acknowledgement(SUCCESS) RF message 298 back to the base RF processor 26. Upon receipt of the RF message 298, the base RF processor 26 sends a PICDATA_confirm(SENT) message 299 to the base PIC processor 22. Then, after the fob RF processor 58 sends the RF message 299, it sends a PICDATA_indication(alert) message 300 to the fob PIC processor 54. Next, the message sequence 260 of FIG. 6A is executed to provide sensor information to the fob 6.

Figures 7A, 7B:
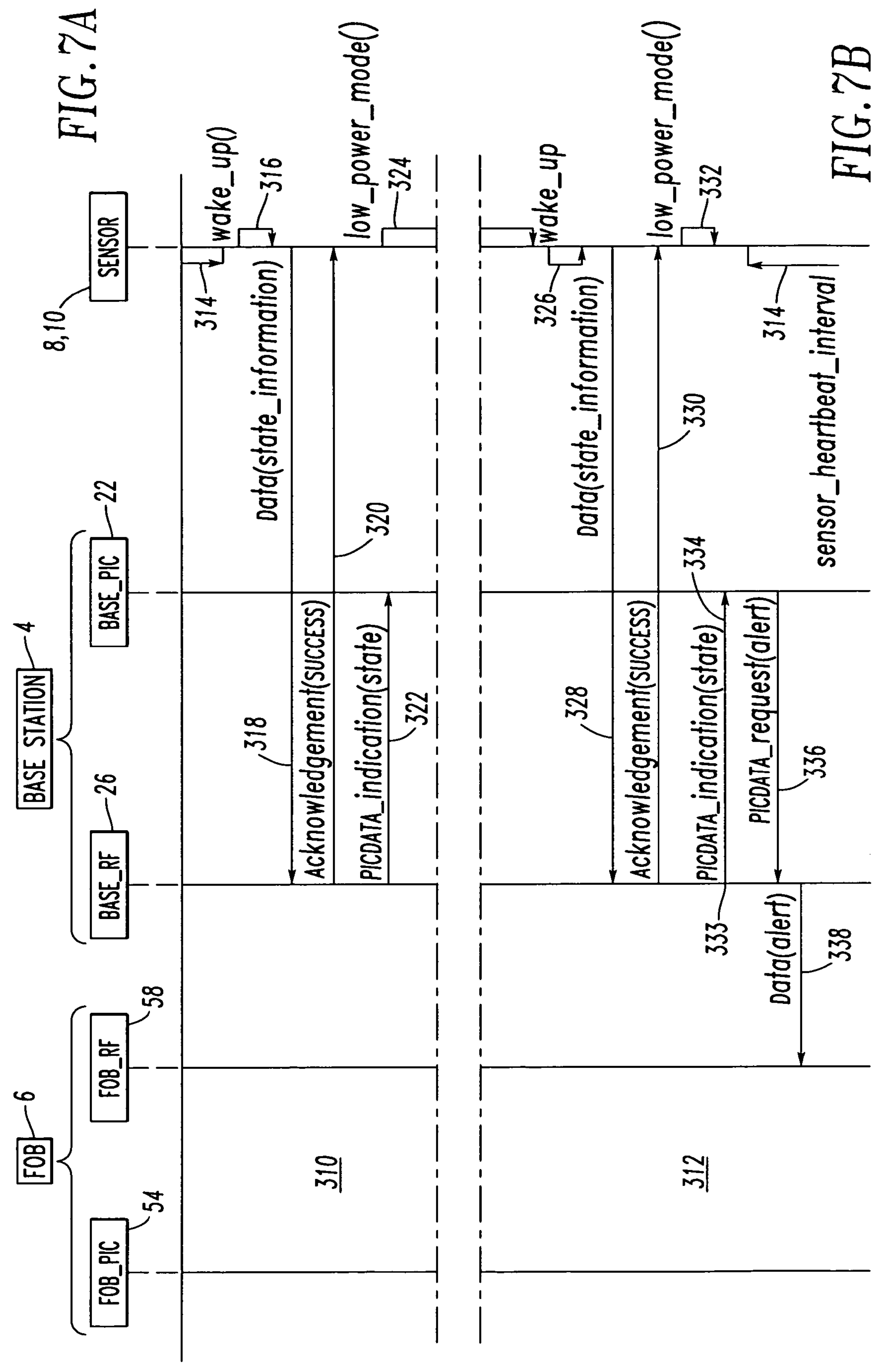
FIGS. 7A-7B are message flow diagrams showing the interaction between one of the sensors and the base station of FIG. 1 for monitoring that sensor.

FIGS. 7A and 7B are message flow diagrams 310,312 showing various messages between one of the sensors 8,10 and the base station 4 of FIG. 1 for monitoring that sensor. FIG. 7A shows that the sensor sends state information to the base station 4 at regular (e.g., periodic) intervals. FIG. 7B shows that the sensor also sends state information to the base station 4 in response to sensor state changes. The sensor timer 98 of FIG. 5 preferably establishes the regular interval, sensor_heartbeat_interval 314 of FIGS. 7A-7B (e.g., without limitation, once per minute; once per hour; once per day; any suitable time period), for that particular sensor, such as 8,10. It will be appreciated that the regular intervals for the various sensors 8,10 may be the same or may be different depending upon the desired update interval for each particular sensor.

In FIG. 7A, after the expiration of the sensor_heartbeat_interval 314, the sensor, such as 10, wakes up (wake_up( )) at 316. Next, the sensor 10 sends a Data(state_information) RF message 318 to the base station RF processor 26, and that RF processor 26 responsively sends an Acknowledgement(SUCCESS) RF message 320 back to the sensor 10. Responsive to receiving that message 320, the sensor 10 enters a low_power_mode( ) 324 (e.g., in order to conserve power of the sensor battery 90 of FIG. 5). Also, responsive to sending that message 320, the base station RF processor 26 sends a PICDATA_indication(state) message 322 to the base station PIC processor 22. Both of the Data(state_information) RF message 318 and the PICDATA_indication(state) message 322 convey the state of the sensor 10 (e.g., sensor on/off; sensor battery OK/low).

The low_power_mode( ) 324 is maintained until one of two events occurs. As was previously discussed, after the expiration of the sensor_heartbeat_interval 314, the sensor 10 wakes up at 316. Alternatively, as shown in FIG. 7B, the sensor 10 wakes up (wake_up( ) 326) in response to a state change (e.g., the on/off digital detector 10 (FIG. 1) detects an on to off transition or an off to on transition of the sensor discrete input (not shown); the analog sensor 8 (FIG. 5) determines a suitable change of its analog input 110). Next, the sensor 10 sends a Data(state_information) RF message 328 to the base station RF processor 26, and that RF processor 26 responsively sends an Acknowledgement(SUCCESS) RF message 330 back to the sensor 10. Responsive to receiving that message 330, the sensor 10 enters a low_power_mode( ) 332. After the expiration of the sensor_heartbeat_interval 314, the sensor 10 wakes up at 316 of FIG. 7A. Next, at 333, the base station RF processor 26 responsively sends a PICDATA_indication(state) message 334 to the base station PIC processor 22. Both of the Data(state_information) RF message 328 and the PICDATA_indication(state) message 334 convey the state of the sensor 10. Responsive to receiving that message 334, the base station PIC processor 22 sends a PICDATA_request(alert) message 336 to the base station RF processor 26. Such an alert is sent whenever there is any sensor state change. Finally, the base station RF processor 26 sends a Data(alert) RF message 338 to the fob RF processor 58. The response by that processor 58, if the fob 6 is in range, and the subsequent activity by the fob 6 are discussed, above, in connection with FIG. 6C. Otherwise, if the fob 6 is out of range, the subsequent activity by the base station 4 is discussed, above, in connection with FIG. 6B.

Figure 8:
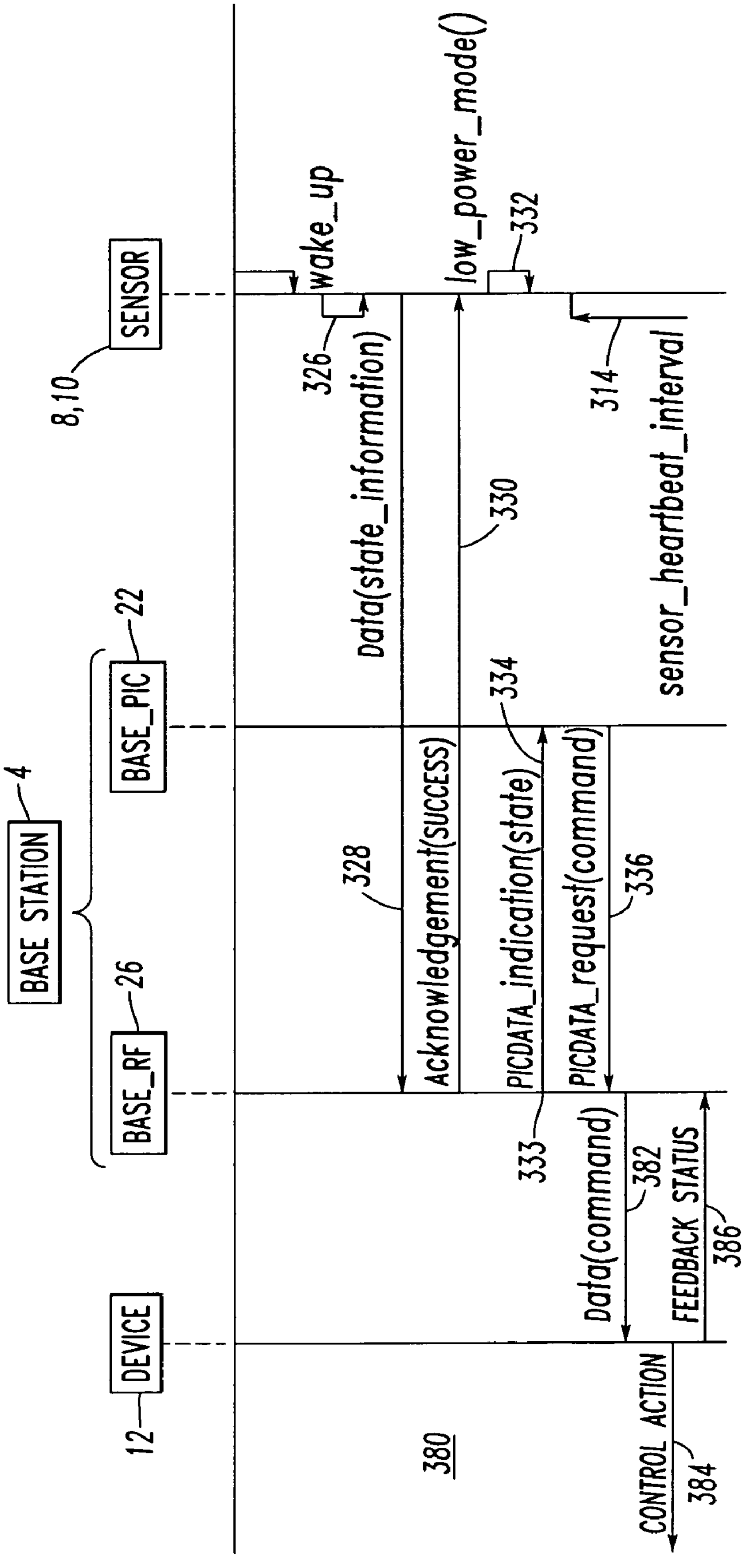
FIG. 8 is a message flow diagram showing the interaction between one of the sensors, the base station and the control device of FIG. 1 for automatically controlling that device.

FIG. 8 is a message flow diagram 380 showing various messages among one of the sensors 8,10, the base station 4 and the device 12 of FIG. 1 for monitoring that sensor and controlling that device. FIG. 8 is similar to FIG. 7B, except that message 382, control action 384 and message 386 are added. As was discussed, the sensors, such as 8,10, send state information to the base station 4 at regular (e.g., periodic) intervals, as shown in FIGS. 7B and 8, or in response to sensor state changes, as shown in FIG. 7A.

Responsive to receiving the message 334, the base station PIC processor 22 sends the PICDATA_request(command) message 336 to the base station RF processor 26. Such a command is sent, in this example, when the sensor state change corresponds to an alert condition (e.g., water detected). Finally, the base station RF processor 26 sends a Data(command) RF message 382 to the device 12. In response, that device 12 undertakes a corresponding control action 384 (e.g., close valve) and sends back feedback status 386 to the base station RF processor 26.

Alternatively, the base station RF processor 26 may send the Data(command) RF message 382 to the device 12 in response to another RF message (not shown) from the fob 6 (FIG. 1). In this manner, the fob 6 may be employed to manually control the device 12.

EXAMPLE 1

Figure 9:
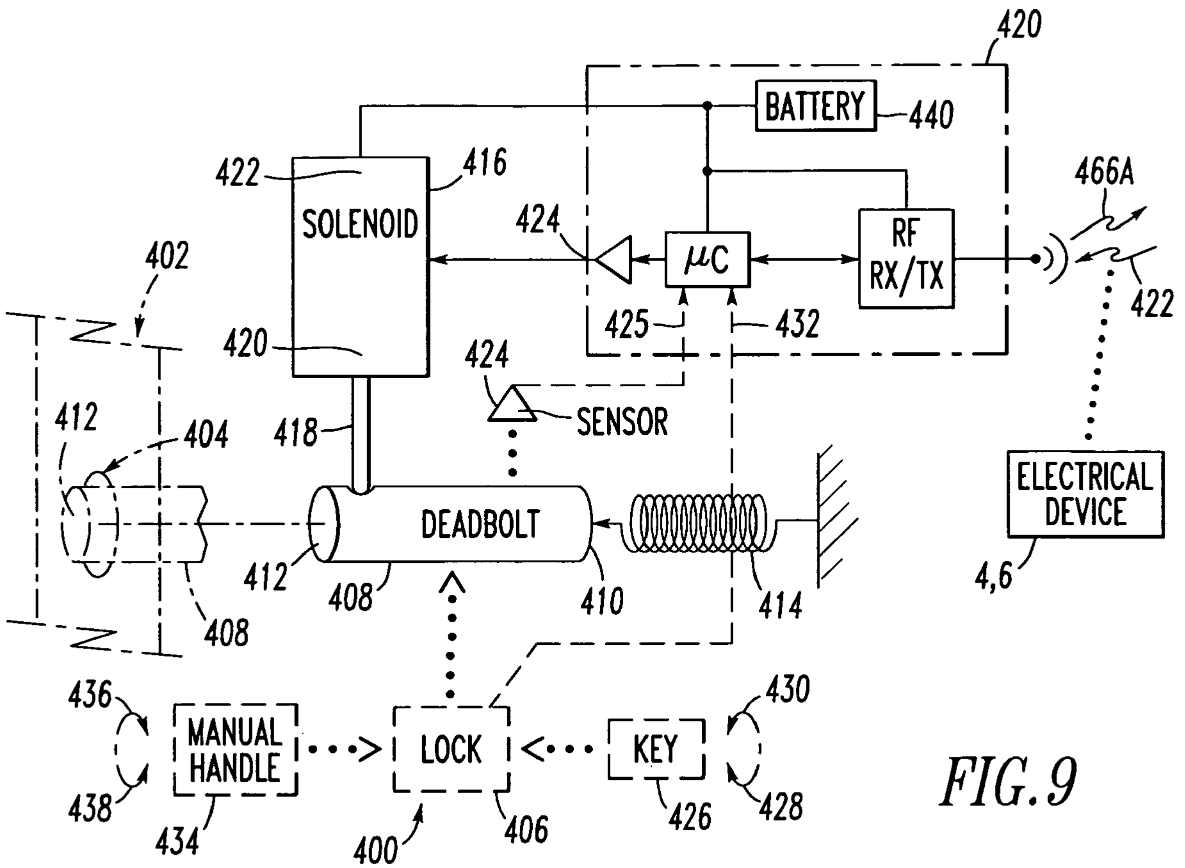
FIG. 9 is a block diagram of a lock device in accordance with the present invention for use with the system of FIG. 1.

Referring to FIG. 9, a lock device 400 for engaging an object 402 (shown in phantom line drawing in FIG. 9), such as a portion of a door frame 404 (shown in phantom line drawing), is shown. The lock device 400 includes a lock 406 having a deadbolt 408 with a first end 410 and a second end 412. The deadbolt second end 412 is structured to disengage from the object 402 in a first position (as shown in solid line drawing in FIG. 9) and to engage the object 402 in a second position (as shown in phantom line drawing in FIG. 9). A spring 414 directly engages and biases the deadbolt first end 410 toward the second position thereof. An electro-mechanical apparatus, such as a suitable electro-magnetic device or the example solenoid 416, includes a stop member, such as the example plunger 418, structured to engage the deadbolt 408, in order to hold the deadbolt 408 in the first position thereof. A wireless controller 420 is structured to receive a wireless signal 422 and responsively energize the solenoid 416, in order to disengage the solenoid plunger 418 from the deadbolt 408 and release the deadbolt 408 to the second position thereof.

The spring 414 stores suitable energy when the lock 406 is opened and the deadbolt 408 moves from the second position (shown in phantom line drawing in FIG. 9) to the first position thereof. The solenoid 416 includes a spring 420 structured to bias the solenoid plunger 418 to engage the deadbolt 408, in order to hold the deadbolt 408 in the first position thereof. The solenoid 416 further includes a coil 422 structured to be energized by the wireless controller 420 through output 424 to retract the plunger 418 and release the deadbolt 408 from the first position to the second position (shown in phantom line drawing) thereof. The wireless controller 420 is preferably structured to momentarily energize the solenoid 416, in order to disengage the solenoid plunger 418 from the deadbolt 408. The lock 406 is structured to be manually unlocked by driving the deadbolt 408 from the second position to the first position (shown in solid line drawing) thereof, in order to charge the spring 414. The lock 406 is further structured to be automatically locked by energizing the solenoid 416 in response to receipt of the wireless signal 422, in order to release the deadbolt 408 from the first position to the second position (shown in phantom line drawing) thereof.

EXAMPLE 2

The lock device 400 preferably includes a sensor 424 structured to sense at least one of the first and second positions of the deadbolt 408. The door lock device 400 includes an unlocked state and a locked state. The sensor 424 cooperates with the wireless controller 420 and is structured to sense the unlocked state or the locked state of the door lock device 400 from the first position or the second position, respectively, of the deadbolt 408.

EXAMPLE 3

The lock 406 may be structured to receive a key 426. Rotation of the key 426 in a first direction 428 in the lock 406 may drive the deadbolt 408 from the second position to the first position (shown in solid line drawing) thereof, in order to charge the spring 414. Rotation of the key 426 in an opposite second direction 430 in the lock 406 may drive the deadbolt 408 from the first position to the second position (shown in phantom line drawing) thereof by overcoming a force from the solenoid plunger 418 or, alternatively, may signal 432 (e.g., through an auxiliary contact (not shown); through a wireless signal (not shown)) the wireless controller 420 to energize the solenoid 416.

EXAMPLE 4

The lock 406 may include a manual handle 434. Movement of the manual handle 434 in a first direction 436 may drive the deadbolt 408 from the second position to the first position (shown in solid line drawing) thereof, in order to charge the spring 414. Movement of the manual handle 434 in an opposite second direction 438 may drive the deadbolt 408 from the first position to the second position (shown in phantom line drawing) thereof by overcoming a force from the solenoid plunger 418 or, alternatively, may signal 432 the wireless controller 420 to energize the solenoid 416.

EXAMPLE 5

The solenoid 416 and the wireless controller 420 are both powered from a battery 440.

EXAMPLE 6

Alternatively, the solenoid 416 and/or the wireless controller 420 may be powered from a suitable AC to DC power source (not shown).

EXAMPLE 7

The sensor 424 may be any suitable sensor, such as, for example, without limitation, one of a cam switch, a photo sensor and a proximity sensor.

EXAMPLE 8

Figure 10:
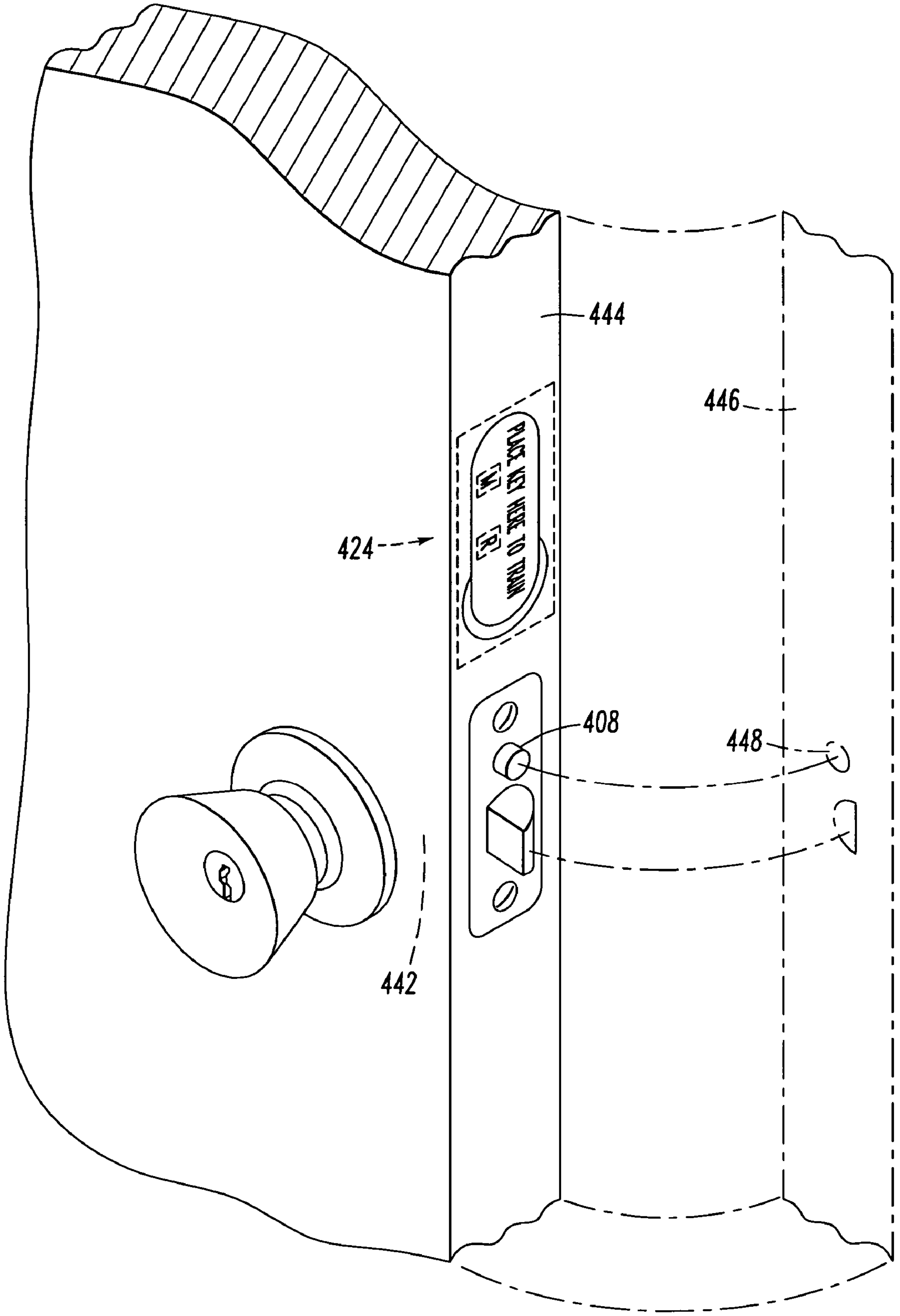
FIG. 10 is an isometric view of a door including a lock device having an open/close sensor in accordance with another embodiment of the invention.

As shown in FIG. 10, a lock device 442 (shown in hidden line drawing), which may be the same as or similar to the lock device 400 of FIG. 9, is structured for mounting in a door 444 having a frame 446 (shown in phantom line drawing). The object 448 that is engaged by the deadbolt 408 is a portion of the frame 446 of the door 444.

EXAMPLE 9

Figure 11:
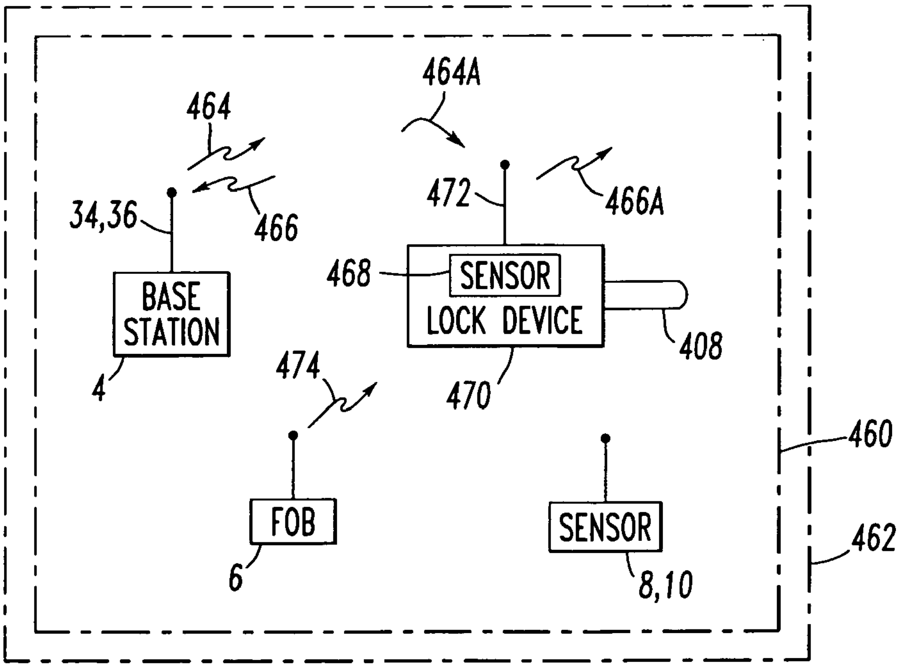
FIG. 11 is a block diagram of a system including the lock device of FIG. 10.

Referring to FIG. 11, a system 460 for a structure 462 includes an electronic device, such as the base station 4 of FIG. 2A and a suitable user interface, such as a wireless handheld electronic device, such as the fob 6 of FIG. 3, outputting first wireless signals 464 and inputting second wireless signals 466. One or more sensors 8,10, such as the sensor 468, may be the same as or similar to the sensor 8 of FIG. 5, and may sense and send information such as a corresponding one 466A of the second wireless signals 466. One or more devices, such as the door lock device 470, may be the same as or similar to the lock device 400 of FIG. 9. The door lock device 470 outputs a control action to lock a door (not shown) through the deadbolt 408 and includes a wireless communication port 472, which receives a corresponding one 464A of the first wireless signals 464 from the wireless communication port 36 of the base station 4.

EXAMPLE 10

In this example, the sensor 424 (FIG. 9) is structured to output a sensed signal 425 representing one of the first and second positions of the deadbolt 408. The wireless controller 420 (FIG. 9) is further structured to receive the sensed signal 425 and output a corresponding one 466A of the second wireless signals 466 (FIG. 11). Those second wireless signals 466 are received by the base station 4. The fob 6 is structured to output third wireless signals 474. The base station 4 is structured to output at least some of the first wireless signals 464 to the wireless controller 420 (FIG. 9) in response to corresponding ones of the third wireless signals 474.

EXAMPLE 11

The first and third wireless signals 464,474 are limited to cause the wireless controller 420 (FIG. 9) to energize the solenoid 416 (FIG. 9), in order to release the deadbolt 408 from the first position to the second position (shown in phantom line drawing in FIG. 9) thereof. In this example, no wireless signal is employed to unlock the deadbolt 408. That action must be initiated manually (e.g., through the key 426 or manual handle 434 of FIG. 9).

EXAMPLE 12

As another alternative to the example solenoid 416, a suitably small motor (not shown) with suitable gear(s) and/or cam(s) may be employed to move a stop member, such as the example plunger 418, and release the deadbolt 408.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A lock device for engaging an object, said lock device comprising:

a lock including a deadbolt having a first end and a second end, which is structured to disengage from said object in a first position and to engage said object in a second position;

a spring directly engaging and biasing the first end of said deadbolt toward the second position thereof;

an electro-mechanical apparatus including a stop member structured to engage said deadbolt, in order to hold said deadbolt in the first position thereof; and a wireless controller structured to receive a wireless signal and responsively energize said electro-mechanical apparatus, in order to disengage the stop member of said electro-mechanical apparatus from said deadbolt and release said deadbolt to the second position thereof, wherein said lock is structured to receive a key, wherein rotation of said key in a first direction in said lock drives said deadbolt from the second position to the first position thereof, in order to charge said spring, and wherein rotation of said key in an opposite second direction in said lock drives said deadbolt, when said stop member engages said deadbolt, from the first position toward the second position thereof by overcoming a force from the stop member of said electro-mechanical apparatus.

2. A lock device for engaging an object, said lock device comprising:

a lock including a deadbolt having a first end and a second end, which is structured to disengage from said object in a first position and to engage said object in a second position;

a spring directly engaging and biasing the first end of said deadbolt toward the second position thereof;

an electro-mechanical apparatus including a stop member structured to engage said deadbolt, in order to hold said deadbolt in the first position thereof; and a wireless controller structured to receive a wireless signal and responsively energize said electro-mechanical apparatus, in order to disengage the stop member of said electro-mechanical apparatus from said deadbolt and release said deadbolt to the second position thereof, wherein said lock includes a manual handle; wherein movement of said manual handle in a first direction drives said deadbolt from the second position to the first position thereof, in order to charge said spring; and wherein movement of said manual handle in an opposite second direction drives said deadbolt, when said stop member engages said deadbolt, from the first position toward the second position thereof by overcoming a force from the stop member of said electro-mechanical apparatus.

3. The lock device of claim 1 wherein said spring stores energy when said lock is opened and said deadbolt moves from the second position to the first position thereof.

4. The lock device of claim 1 wherein said lock is structured to be manually unlocked by driving said deadbolt from the second position to the first position thereof, in order to charge said spring; and wherein said lock is further structured to be automatically locked by energizing said electro-mechanical apparatus in response to receipt of said wireless signal, in order to release said deadbolt from the first position to the second position thereof.

5. The lock device of claim 1 wherein said electro-mechanical apparatus is a solenoid including a plunger as said stop member and a spring structured to bias the plunger of said solenoid to engage said deadbolt, in order to hold said deadbolt in the first position thereof and wherein said solenoid further includes a coil structured to be energized by said wireless controller to retract said plunger and release said deadbolt from the first position to the second position thereof.

6. The lock device of claim 1 wherein said wireless controller is structured to momentarily energize said electro-mechanical apparatus, in order to disengage the stop member of said electro-mechanical apparatus from said deadbolt.

7. The lock device of claim 1 wherein said lock is structured to be manually unlocked by driving said deadbolt from the second position to the first position thereof.

8. The lock device of claim 1 wherein said lock device is structured for mounting in a door having a frame; and wherein said object is a portion of the frame of said door.

9. A lock device for engaging an object, said lock device comprising:

a lock including a deadbolt having a first end and a second end, which is structured to disengage from said object in a first position and to engage said object in a second position;

a spring directly engaging and biasing the first end of said deadbolt toward the second position thereof;

an electro-mechanical apparatus including a stop member structured to engage said deadbolt, in order to hold said deadbolt in the first position thereof;

a sensor structured to sense at least one of the first and second positions of said deadbolt; and a wireless controller structured to receive a wireless signal and responsively energize said electro-mechanical apparatus, in order to disengage the stop member of said electro-mechanical apparatus from said deadbolt and release said deadbolt to the second position thereof, wherein said lock includes a manual handle, wherein movement of said manual handle in a first direction drives said deadbolt from the second position to the first position thereof, in order to charge said spring, and wherein movement of said manual handle in an opposite second direction drives said deadbolt, when said stop member engages said deadbolt, from the first position toward the second position thereof by overcoming a force from the stop member of said electro-mechanical apparatus.

10. The lock device of claim 9 wherein said wireless signal is a first wireless signal; wherein said sensor is structured to output a sensed signal representing one of the first and second positions of said deadbolt; and wherein said wireless controller is further structured to receive said sensed signal and output a corresponding second wireless signal.

11. The lock device of claim 9 wherein said sensor is selected from the group consisting of a cam switch, a photo sensor and a proximity sensor.

12. The lock device of claim 5 wherein the plunger of said solenoid includes an end having a rounded surface; and wherein said deadbolt includes a recessed portion having a rounded surface, which is engaged by the rounded surface of the end of the plunger of said solenoid in said first position of said deadbolt.

* * * * *